US008266260B2

(12) United States Patent
Pathak et al.

(10) Patent No.: US 8,266,260 B2
(45) Date of Patent: Sep. 11, 2012

(54) METHOD AND SYSTEM FOR UPDATING THE SOFTWARE OF MULTIPLE NETWORK NODES

(75) Inventors: Rabindra Pathak, Vancouver, WA (US); Joseph B. Murdock, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1065 days.

(21) Appl. No.: 12/001,378

(22) Filed: Dec. 11, 2007

(65) Prior Publication Data
US 2009/0150878 A1    Jun. 11, 2009

(51) Int. Cl.
*G06F 15/177*    (2006.01)
(52) U.S. Cl. .......................................... 709/221; 709/219
(58) Field of Classification Search .................... 709/221
See application file for complete search history.

(56) References Cited

U.S. PATENT DOCUMENTS

| 5,860,012 | A  | * | 1/1999  | Luu ................. 717/175 |
| 6,222,856 | B1 | * | 4/2001  | Krishnan et al. .............. 370/468 |
| 6,675,382 | B1 |   | 1/2004  | Foster ........................... 717/177 |
| 2002/0099844 | A1 | * | 7/2002  | Baumann et al. ............. 709/232 |
| 2003/0204603 | A1 | * | 10/2003 | Buchanan et al. ............ 709/228 |
| 2005/0005047 | A1 | * | 1/2005  | Keeney et al. ................ 710/100 |
| 2005/0132348 | A1 |   | 6/2005  | Meulemans et al. .......... 717/168 |
| 2005/0132349 | A1 |   | 6/2005  | Roberts et al. ................ 717/168 |
| 2005/0207415 | A1 | * | 9/2005  | Curcio et al. ................. 370/390 |
| 2005/0216910 | A1 |   | 9/2005  | Marchand ..................... 717/174 |
| 2006/0130037 | A1 |   | 6/2006  | Mackay ........................ 717/168 |
| 2006/0130045 | A1 |   | 6/2006  | Wesley et al. ................. 717/168 |
| 2006/0159127 | A1 |   | 7/2006  | Childress et al. ............. 370/468 |
| 2006/0265524 | A1 | * | 11/2006 | Fricke et al. .................... 710/33 |
| 2007/0266175 | A1 |   | 11/2007 | Bitterlich ...................... 709/242 |

FOREIGN PATENT DOCUMENTS

| JP | 10-105406 A | 4/1998 |
| JP | 2000-222311 A | 8/2000 |
| JP | 2001-166943 A | 6/2001 |
| JP | 2002-032284 A | 1/2002 |
| JP | 2003-108590 A | 4/2003 |
| JP | 2004-199578 A | 7/2004 |
| JP | 2004-341967 A | 12/2004 |
| JP | 2007-026374 A | 2/2007 |

* cited by examiner

*Primary Examiner* — Christopher Biagini
(74) *Attorney, Agent, or Firm* — Scot A. Reader

(57) ABSTRACT

A method and system for updating a group of network nodes, such as a group of MFPs, with replacement software in a manner that improves network performance and the predictability of a completion time for installation of the replacement software involves throttling distribution of a software update package to avoid resource oversubscription while time-bounding distribution so that installation of the software update on all of the network nodes can be completed by a certain time and, in some embodiments, further involves determining a start time for distribution of the software update package based at least in part on a scheduled installation time selected by a network administrator, which provides a high degree of confidence that installation of the software update across the entire group of network nodes will be completed around a scheduled time (e.g. during "off hours") notwithstanding the staggered distribution of the software update package.

14 Claims, 4 Drawing Sheets

METHOD AND SYSTEM FOR UPDATING THE SOFTWARE OF MULTIPLE NETWORK NODES

BACKGROUND OF THE INVENTION

The present invention relates to updating a group of network nodes with replacement software and, more particularly, to a method and system for updating a group of multifunction printers (MFPs) with replacement software wherein the method and system improve network performance and the predictability of a completion time for installation of the replacement software.

Network nodes, such as MFPs, are becoming increasingly sophisticated. This increased sophistication has brought with it the need for more complex software, which is oftentimes firmware. The added complexity of MFP software has led to a higher incidence of coding errors, called software bugs, and more frequent software upgrades that enhance the feature set of MFPs. To remove software bugs and enable software upgrades, software updates are regularly distributed and installed on MFPs.

Various schemes have been used to update large groups of MFPs that require replacement software. In these schemes, a software update package instructing the MFPs how to update their software is typically distributed from a software update server over a network to the MFPs and installed immediately upon receipt. The timing of distribution of the software update package is generally determined by an update management application executing on the software update server.

A significant technical challenge that arises in updating the software of a large group of MFPs is how to avoid resource oversubscription. Typically, the size of an MFP software update package is on the order of tens of megabytes. When a software update server attempts to distribute a software update package to a large number of MFPs around the some time, the network may become congested. When this happens, the distribution process is slowed and other applications competing for network bandwidth may be starved. Moreover, the processing resources of the software update server may become oversubscribed, further delaying the distribution. In extreme cases, the network or the software update server may even crash.

In addition to starving other applications and risking network or server outages, attempts to distribute a software update package to a large group of MFPs around the same time can render meaningless a software update installation time chosen by a network administrator. Network administrators often want software updates to be installed on MFPs during "off hours" when the usage level of the MFPs is minimal, and therefore start distribution of the software update package during these "off hours". However, if delivery of the software update package is substantially delayed due to resource oversubscription, actual installation may creep into hours of peak usage.

In an attempt to avoid resource oversubscription problems, some update management applications allow network administrators to stagger distribution of software updates to an MFP group. In these applications, software update packages are distributed and installed over "threads" and a network administrator selects how many threads run in parallel. When installation is completed on the first parallel group of threads, the management application starts distribution on the next parallel group of threads, and so on. However, the burden to choose an optimum number of threads to run in parallel is on the network administrator. If the network administrator chooses a number that is too large, the update process may be plagued by resource oversubscription problems. If the network administrator chooses a number that is too small, the update process may take too long and installation may extend into hours of peak MFP usage.

SUMMARY OF THE INVENTION

The present invention, in a basic feature, provides a method and system for updating a group of network nodes, such as a group of MFPs, with replacement software wherein the method and system improve network performance and the predictability of a completion time for installation of the replacement software. These improvements are facilitated by throttling distribution of a software update package to avoid resource oversubscription while time-bounding distribution so that installation of the software update on all of the network nodes can be completed by a certain time. Distribution throttling involves automatically determining the number of parallel threads over which the software update package is distributed based at least in part on a determination of effective network bandwidth, and in some embodiments automatically determining a distribution time required to distribute the software update package to a group of network nodes over the parallel threads based at least in part on the number of parallel threads and automatically determining a start time for distributing the software update package over the parallel threads based at least in part on the distribution time. In some embodiments of the invention, the start time is further automatically determined based at least in part on a scheduled installation time selected by a network administrator, which provides a high degree of confidence that installation of the software update across the entire group of network nodes will be completed around a scheduled time (e.g. during "off hours") notwithstanding the staggered distribution of the software update package.

In one aspect of the invention, a software update server comprises a network interface, a memory and a processor communicatively coupled with the network interface and the memory, wherein under control of the processor an effective network bandwidth is determined based at least in part on information received via the network interface and a number of parallel threads over which a software update package stored in the memory will be distributed via the network interface is determined based at least in part on the effective network bandwidth.

In some embodiments, under control of the processor a distribution time required to distribute the software update package to a group of network nodes over sets of the parallel threads is determined based at least in part on the number of parallel threads.

In some embodiments, under control of the processor a start time for distributing the software update package over the sets of the parallel threads is determined based at least in part on the distribution time.

In some embodiments, the number of parallel threads is further determined under control of the processor based at least in part on an amount of the effective network bandwidth allocated for software updates by a network administrator.

In some embodiments, the number of parallel threads is further determined under control of the processor based at least in part on an amount of the effective network bandwidth allocated per thread.

In some embodiments, the distribution time is further determined under control of the processor based at least in part on a number of network nodes within the group.

In some embodiments, the distribution time is further determined under control of the processor based at least in part on a size of the software update package.

In some embodiments, the start time is further determined under control of the processor based at least in part on a scheduled installation time selected by a network administrator.

In some embodiments, upon arrival of the start time and under control of the processor the software update package is distributed via the network interface to a first subgroup of network nodes within the group over a first set of parallel threads, wherein the first set of parallel threads has the determined number of parallel threads.

In some embodiments, in response to event notifications received from the first subgroup of network nodes via the network interface and under control of the processor the software update package is distributed via the network interface to a second subgroup of network nodes within the group over a second set of parallel threads, wherein the second set of parallel threads has the determined number of parallel threads.

In some embodiments, upon arrival of a scheduled installation time selected by a network administrator and under control of the processor installation commands are distributed via the network interface to at least a subgroup of network nodes within the group over parallel threads.

In another aspect of the invention, a method for updating a group of network nodes with replacement software comprises the steps of automatically determining an effective network bandwidth and automatically determining a number of parallel threads over which a software update package will be distributed based at least in part on the effective network bandwidth.

In some embodiments, the method further comprises the step of automatically determining a distribution time required to distribute the software update package to the group of network nodes over the parallel threads based at least in part on the determined number of parallel threads.

In some embodiments, the method further comprises the step of automatically determining a start time for distributing the software update package over the parallel threads based at least in port on the distribution time.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
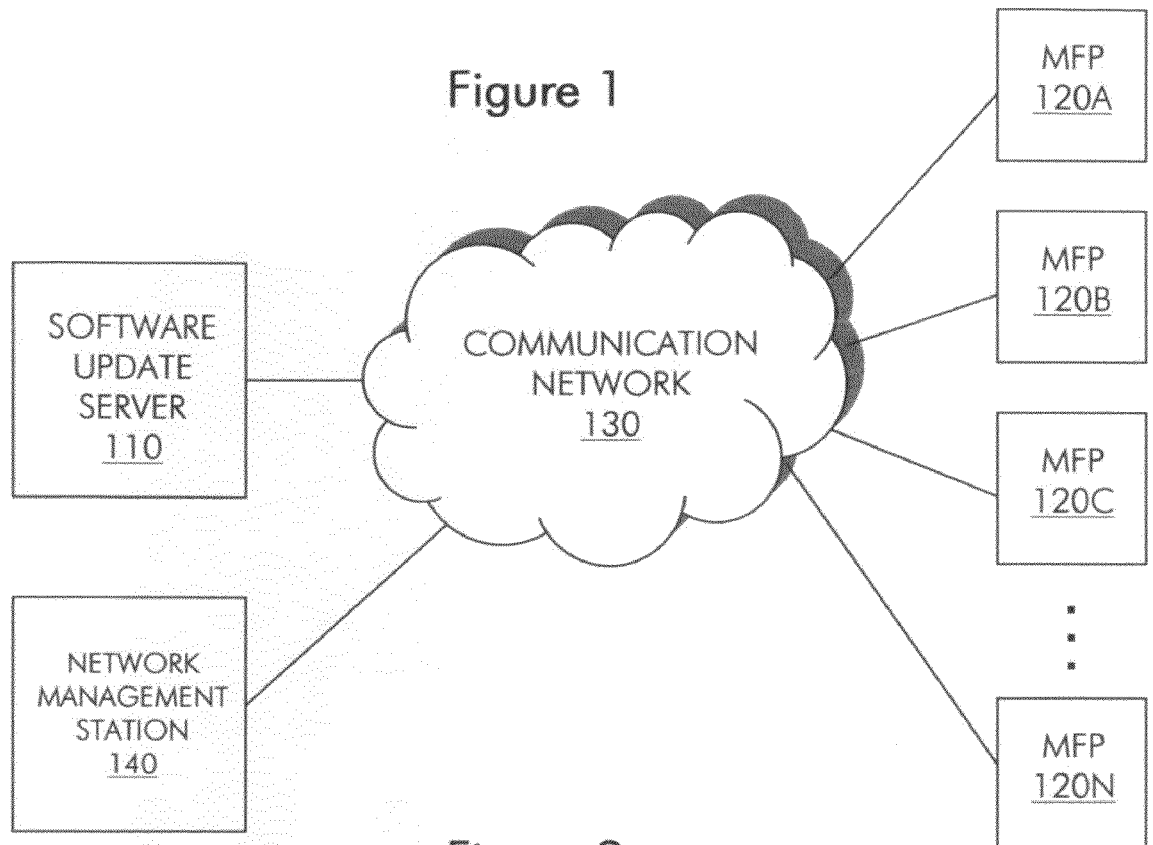
FIG. 1 shows a communication system in some embodiments of the invention.

FIG. 1 shows a communication system in some embodiments of the invention. The communication system includes multiple network nodes. The network nodes include a software update server 110, MFPs 120A through 120N (hereinafter collectively referenced as MFPs 120) and a network management station 140. Server 110 is communicatively coupled with MFPs 120 and station 140 via a communication network 130. Network 130 may be an enterprise network or a service provider network, for example, and may include multiplexing nodes, such as routers, switches and bridges. In some embodiments, network 130 traverses the Internet. Server 110, MFPs 120 and station 140 may have wired or wireless connectivity to network 130.

Server 110 is a data processing element that controls the content and timing of updates to software on MFPs 120. In some embodiments, such software is firmware. MFPs 120 may be associated, for example, by common ownership or usage by a common set of users. Software update types include, for example, patches with corrective code and upgrades with code that supports new features or functionality. In some embodiments, server 110 prepares and distributes to MFPs 120 delta packages reflective of differences between current versions of software running on MFPs 120 and replacement versions of software to be installed on MFPs 120. In such embodiments, server 110 may compare the current version of software running on MFPs 120 with a replacement version of software stored on server 110 to determine an update path and use the update path to construct an appropriate delta package for distribution to MFPs 120. MFPs 120 receive delta packages from server 110 and, upon prompting by server 110, perform an installation in which delta packages are executed to update to the replacement version. In some embodiments, software updates are pulled from server 110 pursuant to requests made by MFPs 120. In other embodiments, software updates are pushed by server 110 to MFPs independent of any request.

MFPs 120 are imaging devices that provide multiple types of imaging services, such as printing, scanning, copying, foxing, filing, displaying and format conversion. MFPs 120 each have a wired or wireless network interface, such as an Ethernet, Wide Area Network (WAN), Universal Serial Bus (USB), Bluetooth, Infrared Data Association (IrDa), wireless local area network (LAN) (e.g. Wi-Fi), World Interoperability for Microwave Access (WiMA), cellular network, or Public Switched Telephone Network (PSTN) interface that communicatively couples MFPs 120 to network 130. MFPs 120 are each capable of receiving via their respective network interfaces imaging jobs in an MFP-ready format and processing the imaging jobs. MFPs 120 are also each adapted to receive via their respective network interfaces software update packages (e.g. delta packages). Internal to each of MFPs 120, a processor, memory, network interface, scan/copy engine and print engine are communicatively coupled. The processor executes imaging software (e.g. imaging firmware) to provide supported imaging services. The processor also executes update software (e.g. update firmware) to update to a replacement version of software per instructions in software update packages received via the network interface. The scan/copy engine includes scanner/copier logic, such as one or more integrated circuits (ICs), and a mechanical section for performing a scanning and copying functions. For example, the scan/copy engine may have a line image sensor mounted on a movable carriage for optically scanning a document under the control of a scanner IC and storing the scanned document into the memory. The print engine includes printer logic, such as one or more printer ICs, and a mechanical section, such as a color ink jet head mounted on a movable carriage, for outputting print data in hard copy format under control of the one or more printer ICs. The memory may consist of one or more random access memories (RAMs) and one or more read only memories (ROM). While MFPs 120 in the described embodiment support printing, scanning and copying and other imaging functions, in other embodiments MFPs may support different sets of imaging functions.

Station 140 is a data processing element that allows a human network administrator to remotely configure software update server 110. In some embodiments, station 140 is a desktop or notebook personal computer (PC) or workstation that executes update management software. Station 140 has a user interface, a network interface and a memory communicatively coupled with a processor. The user interface includes a data input element, such as a keyboard, keypad or touch-sensitive navigation tool for receiving input from the network administrator and a data output element, such as a light emitting diode (LED) display panel or liquid crystal display (LED) panel for displaying output to the network administrator. The network interface is a wired or wireless network interface, such as an Ethernet, WAN, USB, Bluetooth, IrDa, Wi-Fi, WiMAX, cellular, or PSTN interface that communicatively couples station 140 to network 130. The memory includes one or more RAMs and one or more ROMs. The processor executes update management software, which allows the network administrator to input configuration information using the data input element and transmits the configuration information to server 110 where the information is applied.

Figure 2:
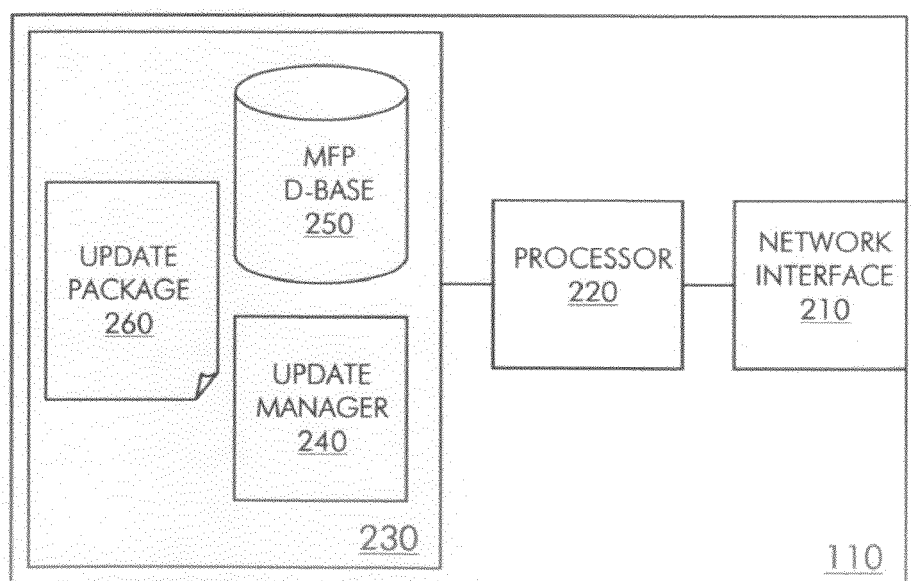
FIG. 2 shows the software update server of FIG. 1 in greater detail.

Turning now to FIG. 2, server 110 is shown in more detail to include a network interface 210 and a memory 230 communicatively coupled with a processor 220. Network interface 210 is a wired or wireless network interface, such as an Ethernet, WAN, USB, Bluetooth, IrDa, Wi-Fi, WiMAX, cellular, or PSTN interface that communicatively couples server 110 to network 130. Memory 230 has stored therein an update manager 240, an MFP database 250 and a software update package 260. Memory 230 may have one or more RAMs and one or more ROMs. Manager 240 is software executable by processor 220 to provide supported software update services. Database 250 stores information utilized by manager 240 to provide supported software update services, such as an address, current software version and update status for each of MFPs 120. Package 260 is constructed by manager 240 and includes information sufficient to enable MFPs 120 to update to a replacement version of software, which may be a corrected version or may be an upgraded version that supports new features or functionality. In some embodiments, package 260 is a delta package. In the illustrated embodiment, a common software update package is prepared and distributed to all MFPs 120, although in other embodiments individually tailored software update packages may be prepared and distributed to individual ones of MFPs 210.

Figure 3:
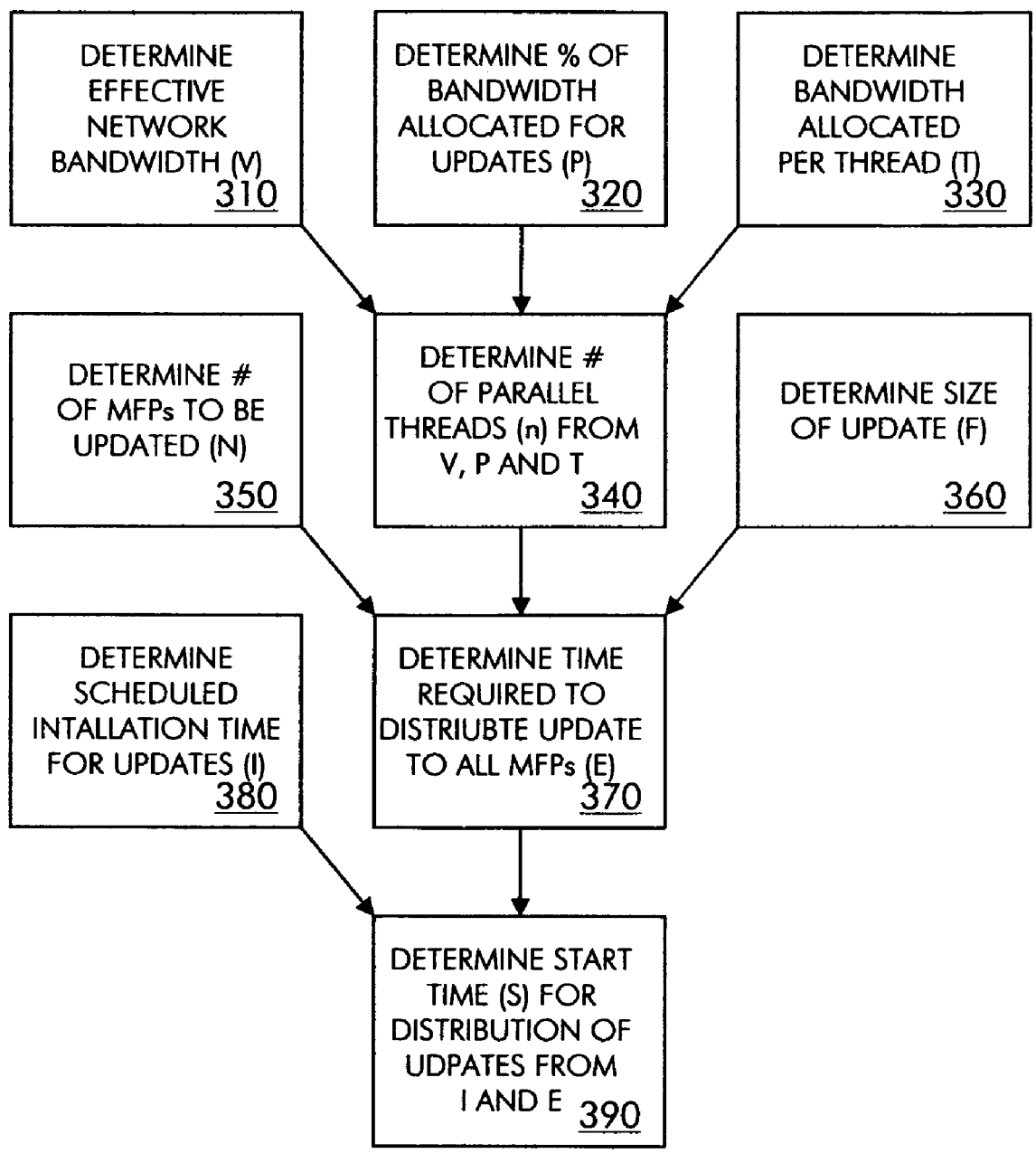
FIG. 3 shows a method for determining a start time for threaded distribution of a software update package to an MFP group in some embodiments of the invention.

FIG. 3 illustrates a method for determining a start time for threaded distribution of package 260 to MFPs 120 in some embodiments of the invention. Initially, server 110 determines effective network bandwidth (V) (310). In some embodiments, server 110 executes a well-known connection bandwidth monitor, such as Absolute Futurity BBMonitor, to determine effective network bandwidth by transmitting and receiving data via network interface 210. In other embodiments, manager 240 has native support for a connection bandwidth monitor for determining effective network bandwidth. In either event, manager 240 determines a percentage of the effective network bandwidth allocated for software updates (P) (320). In some embodiments, manager 240 receives as configuration information from station 140 a percentage of the effective network bandwidth allocated for software updates (P). Additionally, manager 240 determines an amount of the effective network bandwidth allocated per thread (T) (330), which amount may be preconfigured on manager 240 or received as configuration information from station 140. From the effective network bandwidth V, percentage of the effective network bandwidth allocated for software updates (P) and amount of the effective network bandwidth allocated per thread (T), manager 240 computes a maximum number of parallel threads (n) (340), that is, a limit number of concurrent threads over which package 260 may be distributed to MFPs 210. In some embodiments, manager 240 computes the maximum number of parallel threads (n) according to the formula $n=(V*P)/T$. By judiciously determining the maximum number of parallel threads (n) in light of the effective network bandwidth (V) and a specified share of the effective network bandwidth reserved for software updates (P), resource oversubscription and starvation of other applications may be advantageously avoided while package 260 is being distributed to the group of MFPs 210.

Manager 240 next determines the number of MFPs to be updated (N) (350) and the size of package 260 (F) (360). In some embodiments, manager 240 determines the number of MFPs requiring updating by reference to database 250, wherein update status (e.g. "Firmware Update Required") is maintained for all MFPs serviced by server 110, including MFPs 120. For simplicity, in the illustrated example it will be presumed that all MFPs 120, and no other MFPs, require updating. From the number of MFPs to be updated (N), the maximum number of parallel threads (n) and the size of package 260 (F), manager 240 determines a distribution time (E) required to distribute package 260 to MFPs 120 (370). In some embodiments, manager 240 computes the distribution time (E) according to the formula $E=F/T$ in cases where $N<n$ or $N=n$, according to $E=(F/T)*(N/n)$ in cases where $N>n$ and N is divisible by n without any remainder, or according to $E=(F/T)*[Quotient(N/n)+1]$ in cases where $N>n$ and N is divisible by n with remainder.

Manager 240 next determines a scheduled installation time (I) for installing the software update on MFPs 120 (380). In some embodiments, manager 240 receives as configuration information from station 140 a scheduled installation time (I). From the scheduled installation time (I) and the distribution time (E), manager 240 computes a start time (S) for commencing distribution of package 260 to MFPs 120 (390). Manager 240 selects a start time (S) that provides a high degree of confidence that distribution of package 260 to all MFPs 120 will be completed before the scheduled installation time (I). In some embodiments, manager 240 computes the start time (S) according to the formula $S=I-(E+K)$, where K is a time constant added to the distribution time (E) to increase the level of confidence that distribution will be completed before the scheduled installation time (I). By allowing a network administrator to specify a scheduled installation time (I), installation of the software update across the entire group of MFPs 120 may be completed around a scheduled time (e.g. during "off hours") notwithstanding the staggered distribution of package 260.

Figure 4:
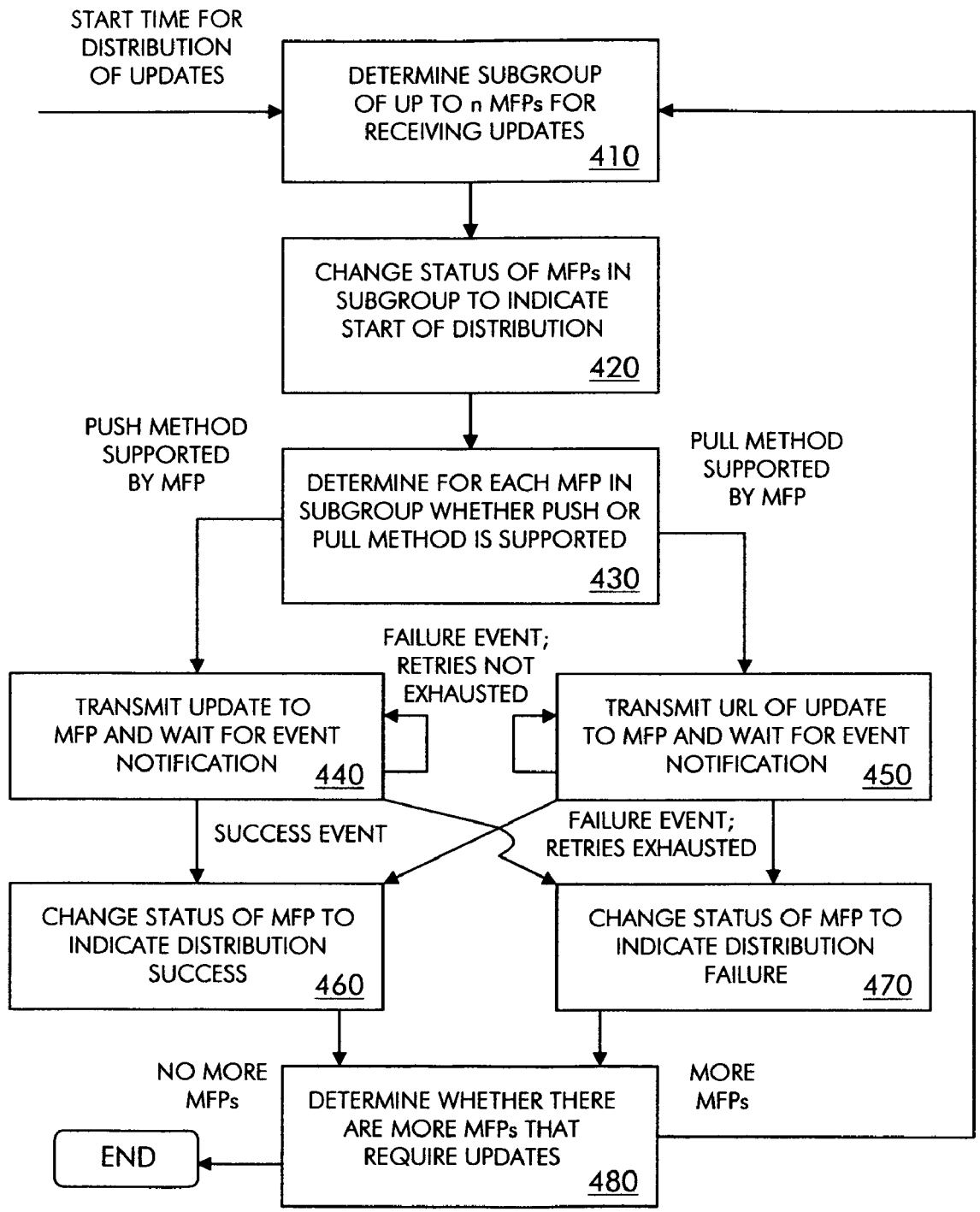
FIG. 4 shows a method for distributing a software update package to an MFP group over parallel threads in some embodiments of the invention.

FIG. 4 illustrates a method for distributing package 260 to MFPs 120 over parallel threads in some embodiments of the invention. When the start time (S) for commencing distribution of package 260 to MFPs 120 arrives, manager 240 is awakened and identifies a first subgroup of MFPs 210 for receiving package 260 over a corresponding first set of parallel threads, wherein the number of MFPs in the first subgroup and the number of parallel threads in the first set does not exceed the maximum number of parallel threads (n) (410). Typically, the number of MFPs in the first subgroup and the number of parallel threads in the first set equals the maximum number of parallel threads (n); however, in the case where the number of MFPs that require updating is less than the maximum number of parallel threads (n), the number of MFPs and threads will be less than the maximum number of parallel threads (n). In some embodiments, manager 240 identifies MFPs for the first subgroup by referencing their update status (e.g. "Firmware Update Required") in database 250 and fetching their address (e.g. Internet Protocol address) from database 250. Once identified to the first subgroup, manager 240 changes the update status of the identified MFPs to indicate start of distribution (e.g. "Firmware Distribution Started") (420) and determines whether the identified MFPs support the push or pull method of distribution (430). In some embodiments, manager 240 determines the supported method of distribution for identified MFPs by referencing database 250. For MFPs that support the push method, manager 240 transmits package 260 to the MFP and waits for an event notification (440). For MFPs that support the pull method, manager 240 transmits a Uniform Resource Locator (URL) from which package 260 can be pulled to the MFP and waits for an event notification (450). If a failure event is received from an MFP then the push or pull process is retried unless a configured number of retries has been exhausted, and where the number of retries has been exhausted manager 240 changes the update status of the MFP in database 250 to indicate a distribution failure (e.g. "Firmware Distribution Failure") (470). If a success event is received from an MFP then manager 240 changes the update status of the MFP in database 250 to indicate successful distribution (e.g. "Firmware Distribution Success") (460). Once the update status of all identified MFPs in the first subgroup has been changed, manager 240 determines whether there are additional MFPs to which package 260 must be distributed (480) and, if so, returns to Step 410 and repeats the distribution process for a second MFP subgroup over a second set of parallel threads.

Figure 5:
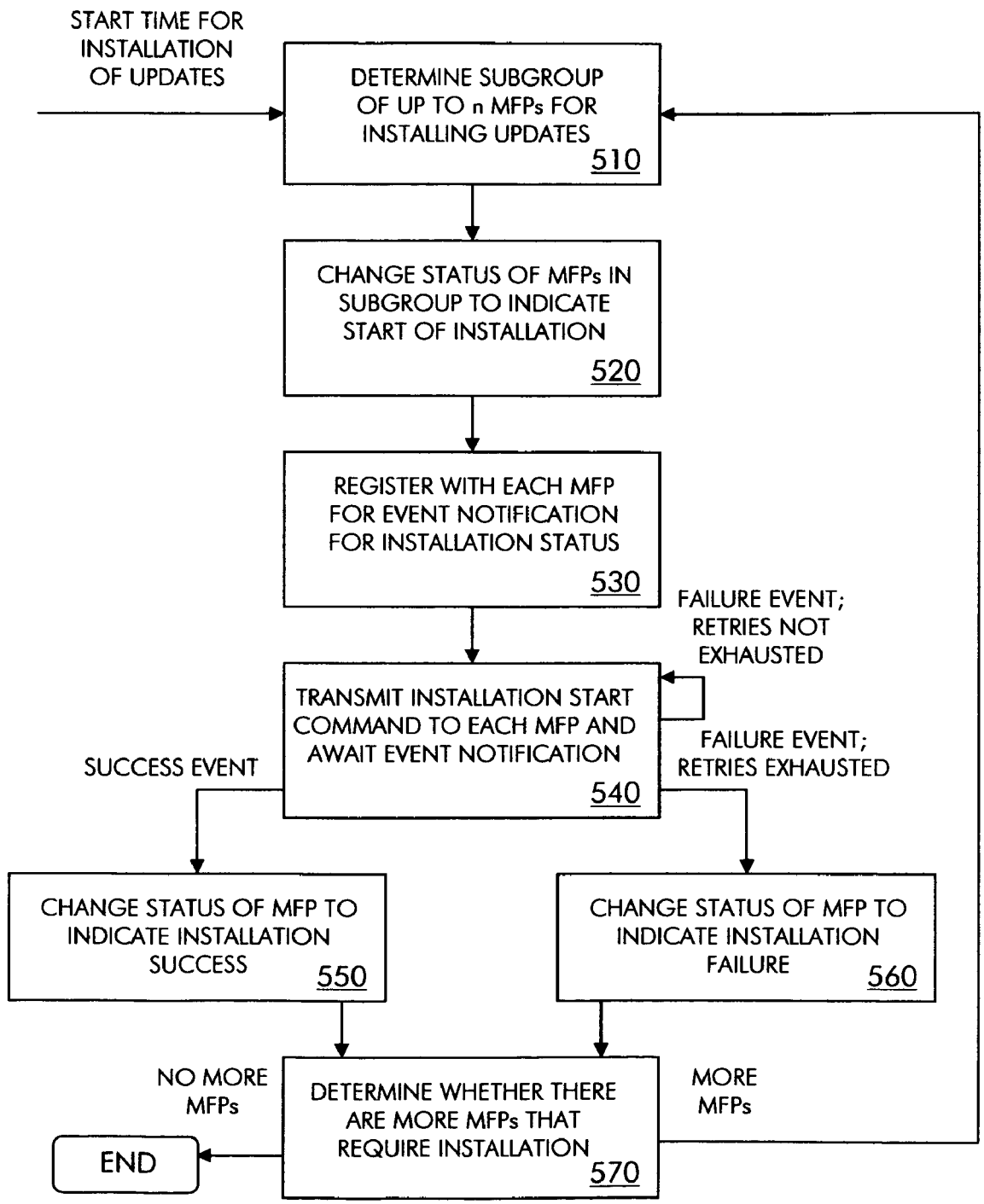
FIG. 5 shows a method for installing a software update on an MFP group in some embodiments of the invention.

FIG. 5 shows a method for installing a software update on MFPs 210 in some embodiments of the invention. When the scheduled installation time (I) arrives for commencing installation of a software update on MFPs 120 using the previously distributed package 260, manager 240 is awakened and identifies a first subgroup of MFPs 210 for commencing installation of package 260 using a corresponding first set of parallel threads, wherein the number of MFPs in the first subgroup and the number of parallel threads in the first set does not exceed the maximum number of parallel threads (n) (510). In some embodiments, manager 240 identifies MFPs for the first subgroup by referencing their update status (e.g. "Firmware Distribution Success") in database 250 and fetching their address from database 250. Once identified to the first subgroup, manager 240 changes the update status of the identified MFPs to indicate start of installation (e.g. "Firmware Installation Started") (520) and registers with each identified MFP for event notification of installation status (530). In some embodiments, manager 240 registers by transmitting a registration command to the identified MFPs. Manager 240 then transmits an installation start command to each identified MFP and waits for an event notification (540). If a failure event is received from an MFP then the installation process is retried unless a configured number of retries has been exhausted, and where the number of retries has been exhausted manager 240 changes the update status of the MFP in database 250 to indicate an installation failure (e.g. "Firmware Installation Failure") (560). If a success event is received from an MFP then manager 240 changes the update status of the MFP in database 250 to indicate successful installation (e.g. "Firmware Installation Success") (550). Once the update status of all identified MFPs in the first subgroup has been changed, manager 240 determines whether there are additional MFPs on which package 260 must be installed (570) and, if so, returns to Step 510 and repeats the installation process for a second MFP subgroup over a second set of parallel threads.

In other embodiments, distribution throttling may be applied in situations where a scheduled installation time is not selected by a network administrator. For example, in some embodiments, installation of the software update on each MFP immediately follows distribution over a thread of the software update package to the MFP, without regard for the status of other MFPs with respect to distribution or installation. In still other embodiments, installation of the software update package on all MFPs immediately follows distribution over sets of parallel threads of the software update package to all MFPs.

It will be appreciated by those of ordinary skill in the art that the invention can be embodied in other specific forms without departing from the spirit or essential character hereof. For example, while the invention has been described primarily in terms of updating the software on a group of MFPs, the invention has applicability to updating the software on groups of other types of network nodes, such as servers, routers, switches and clients. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A software update server, comprising:
a network interface;
a memory; and
a processor communicatively coupled with the network interface and the memory, wherein under control of the processor an effective network bandwidth is determined based at least in part on information received via the network interface, a maximum number of threads in each of at least one set of parallel threads over which a software update package stored in the memory will be distributed via the network interface is determined based at least in part on the effective network bandwidth, a distribution time required to distribute the software update package to a group of network nodes to be updated over sets of the parallel threads is determined based at least in part on a size of the software update package, a preconfigured amount of bandwidth allocated per thread, a number of network nodes to be updated and the maximum number of threads in a set, and a start time for distribution of the software update package to the group of network nodes over the sets of the parallel threads is determined based at least in part on a difference between a scheduled installation time and the required distribution time, and wherein the software update package is distributed via the network interface in accordance with the start time.

2. The server of claim 1, wherein the maximum number of threads is further determined under control of the processor based at least in part on an amount of the effective network bandwidth allocated for software updates.

3. The server of claim 1, wherein upon arrival of the start time and under control of the processor the software update package is distributed via the network interface to a first subgroup of network nodes within the group over a first set of parallel threads, wherein the first set of parallel threads has the determined maximum number of threads.

4. The server of claim 3, wherein in response to event notifications received from the first subgroup of network nodes via the network interface and under control of the processor the software update package is distributed via the network interface to a second subgroup of network nodes within the group over a second set of parallel threads, wherein the second set of parallel threads has the determined maximum number of threads.

5. The server of claim 1, wherein upon arrival of the scheduled installation time and under control of the processor installation commands are distributed via the network interface to at least a subgroup of network nodes within the group over parallel threads.

6. The server of claim 1, wherein the network nodes are multifunction printers (MFPs).

7. The server of claim 1, wherein the required distribution time is computed according to $E=(F/T)*[Quotient(N/n)+1]$, where E is the required distribution time, F is the size of the software update package, T is the preconfigured amount of bandwidth allocated per thread, N is the number network nodes to be updated and n is the maximum number of threads in a set.

8. The server of claim 1, wherein the start time is computed according to $S=I-(E+K)$, were S is the start time, I is the scheduled installation time, E is the required distribution time and K is a time constant.

9. A method for updating a group of network nodes with replacement software, comprising the steps of:
  automatically determining by a software update server an effective network bandwidth; and
  automatically determining by the software update server a maximum number of threads in each of at least one set of parallel threads over which a software update package will be distributed based at least in part on the effective network bandwidth;
  automatically determining by the software update server a distribution time required to distribute the software update package to a group of network nodes to be updated over sets of the parallel threads based at least in part on a size of the software update package, a preconfigured amount of bandwidth allocated per thread, a number of network nodes to be updated and the maximum number of threads in a set;
  automatically determining by the software update server a start time for distribution of the software update package to the group of network nodes over the sets of the parallel threads based at least in part on a difference between a scheduled installation time and the required distribution time; and
  distributing by the software update server the software update package in accordance with the start time.

10. The method of claim 9, wherein the distributing step comprises distributing by the software update server the software update package to a first subgroup of network nodes within the group over a first set of parallel threads, wherein the first set of parallel threads has the determined maximum number of threads.

11. The method of claim 10, further comprising the steps of:
  receiving by the software update server event notifications from the first subgroup of network nodes indicative of successful distribution; and
  distributing by the software update server the software update package to a second subgroup of network nodes within the group over a second set of parallel threads, wherein the second set of parallel threads has the determined maximum number of parallel threads.

12. The method of claim 10, further comprising the step of distributing by the software update server installation commands to at least a subgroup of network nodes within the group over parallel threads.

13. The method of claim 9, wherein the required distribution time is computed according to $E=(F/T)*[Quotient(N/n)+1]$, where E is the required distribution time, F is the size of the software update package, T is the preconfigured amount of bandwidth allocated per thread, N is the number network nodes to be updated and n is the maximum number of threads in a set.

14. The method of claim 9, wherein the start time is computed according to $S=I-(E+K)$, were S is the start time, I is the scheduled installation time, E is the required distribution time and K is a time constant.

\* \* \* \* \*